Figure 1:
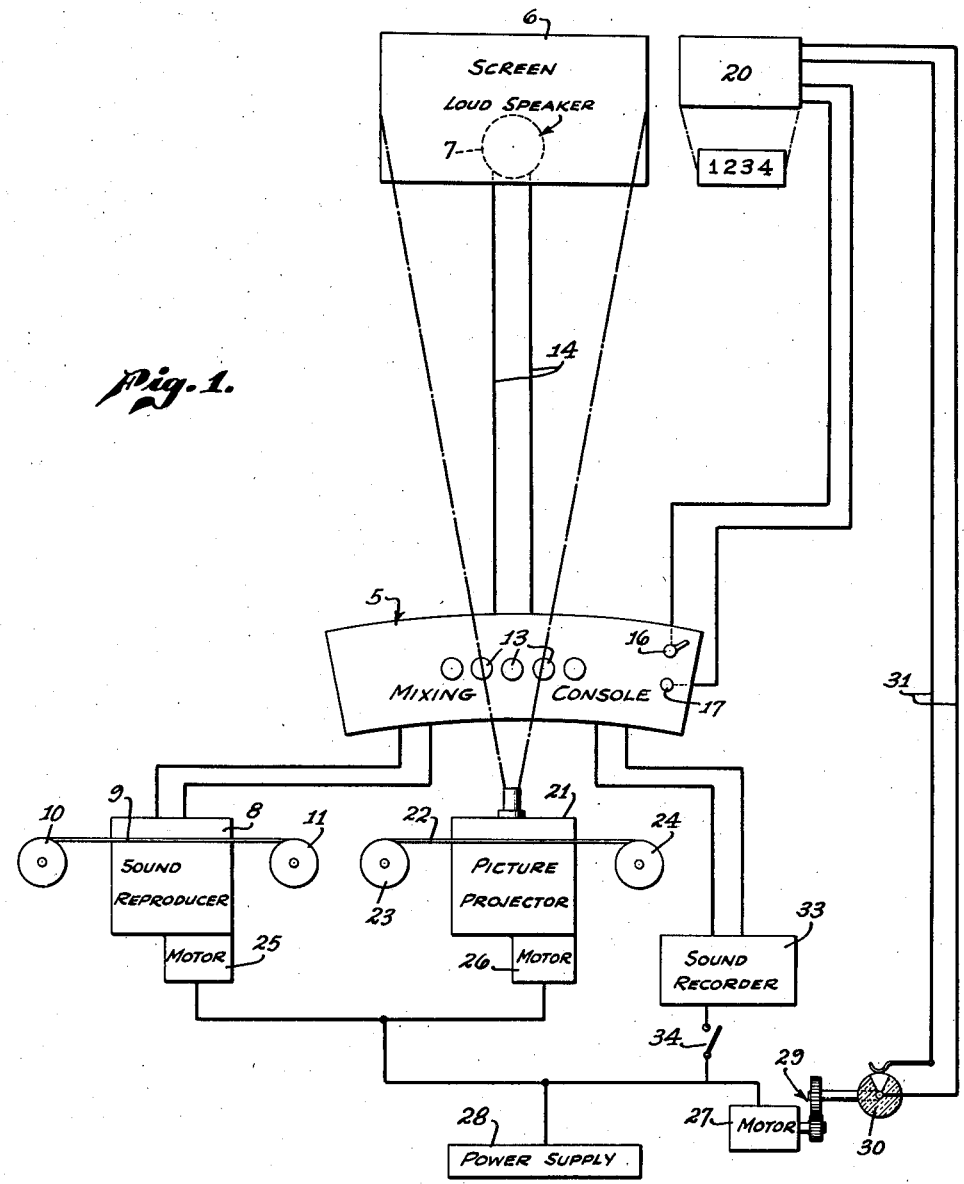

Dec. 28, 1943.  T. C. SHARP  2,338,014

FILM MEASURING APPARATUS

Filed Oct. 4, 1940  2 Sheets-Sheet 1

Inventor

THOMAS C. SHARP,

By Vrl R. Goshaw

Attorney

Dec. 28, 1943. T. C. SHARP 2,338,014
FILM MEASURING APPARATUS
Filed Oct. 4, 1940 2 Sheets-Sheet 2

Inventor
THOMAS C. SHARP,
By
Attorney

Patented Dec. 28, 1943

2,338,014

UNITED STATES PATENT OFFICE 2,338,014

FILM MEASURING APPARATUS

Thomas C. Sharp, North Hollywood, Calif., assignor to Radio Corporation of America, a corporation of Delaware Application October 4, 1940, Serial No. 359,745

5 Claims. (Cl. 235—92)

This invention relates to motion picture apparatus and particularly to apparatus used in the rerecording of sound to produce the combination picture and sound film.

In the production of motion picture sound films, the picture and sound are usually photographed and recorded in the first instance on separate films—and then reproduced simultaneously in individual reproduction apparatus to permit the combining of other sound tracks, to correct irregularities in the dialogue track, or to obtain the proper level and dramatic effects desired for the combination film. In this rerecording process the picture is projected on the screen and the sound track is simultaneously reproduced in front of an operator, called a "mixer," who adjusts the volume and introduces the various sounds at the proper points. Several rehearsal runs are made prior to the final "take," which consists of recording a new sound record combining the various separate records.

During the rehearsals it is necessary to note the point in the dialogue track reel at which modifications or corrections are to be made, such as the elimination of scratches or other variations in the track which introduce deleterious noises, or the reduction of sibilants by inking them over on the original sound track to increase the average density of the track. Points on other of the sound tracks being reproduced where insertions or certain portions are to be deleted are also noted.

The present invention is directed to a system for enabling the mixer to know at what point in the reel a certain incident, such as mentioned above, occurs so that this point may be quickly located by the reproducer operators during inspection of the reels. In brief, the invention is a synchronized footage counter which can be started and re-set from the mixer's console and which is operated simultaneously with the projection of the picture and reproduction of the sound so that the operator is aware at all times of the exact point in the reel which is being reproduced. The footage counter is plainly visible to the mixer at all times.

Heretofore it has been common practice for the mixing operator to advise the reproducing operators at the time an incident occurs to place a slip of paper in the reel being reproduced and the one which is to be later modified in some manner. As a rule, the time required for the instruction to be given and the operator to place the paper causes the marking to be made far from the exact point. This procedure, of course, is not particularly accurate.

The principal object of the invention, therefore, is to facilitate the rerecording of sound tracks.

Another object of the invention is to permit a rerecording operator to determine the exact point in a film reel being reproduced at which any particular incident occurs.

A further object of the invention is to provide a synchronized footage indicator visible to a rerecording operator and controllable by him at a point remote from the footage indicator.

A further object of the invention is to provide a footage indicator with a remote re-set control which may be re-set without interference with the actuating elements of the footage counter.

Figure 2:
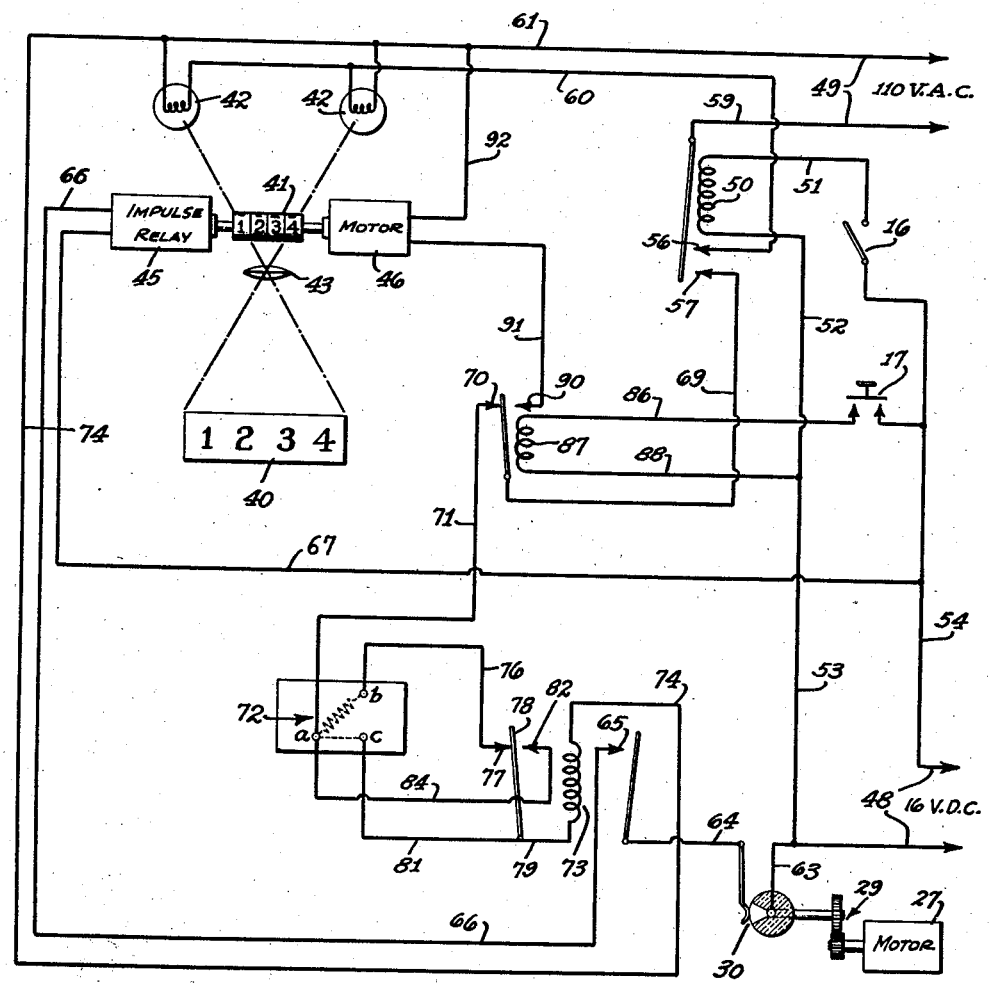

Although the novel features which are believed to be characteristic of this invention are pointed out with particularity in the appended claims, the manner of its organization and the mode of its operation will be better understood by referring to the following description read in conjunction with the accompanying drawings forming a part thereof in which Figure 1 is a diagrammatic drawing of a rerecording system embodying the invention; and Figure 2 is a schematic drawing of the invention.

Referring now to Fig. 1, a mixing console 5 is positioned at the rear portion of a stage, while a motion picture screen 6 is positioned at the front end of the stage, behind which is a loudspeaker 7. The mixing console is connected to a sound reproducer 8 through which a film 9 is fed from a reel 10 to a reel 11. On the mixing console is a plurality of control knobs 13 which are for the purpose of varying the volume from the sound reproducer 8 and other sound reproducers which may be connected through the console to the loudspeaker 7 over conductors 14. Also, on the console are switches 16 and 17 for controlling the operation of a footage counter 20 positioned adjacent the screen 6.

A picture projector 21 projects a picture on the screen 6 from a film 22 supplied from a reel 23 and taken up by a reel 24. The sound reproducer 8 and the picture projector 21 are driven by individual interlocked motors 25 and 26, respectively, while a motor 27, also interlocked with motors 25 and 26 from a common power supply 28, drives, through a series of reduction gears 29, an interrupter 30 which sends, in synchronism with the rotation of the motors 25 and 26, impulses over conductors 31 to the footage counter 20. After the rehearsals have determined the proper combination desired, the output from the sound reproducers is then impressed upon a sound recorder 33 after it is connected to power supply 28 through a switch 34.

From the above description, it is realized that during the projection of the picture and the reproduction of the sound, the footage counter 20 operates to show the number of feet of film having run through the apparatus and the exact point being reproduced at that instant. As each reel has footage numbers along the edges thereof, it is a very simple procedure for the reproducer operators to subsequently determine the exact point of any incident when the mixer makes note of the footage of counter 20 upon a cue sheet. The reproducer operator need only add the number of feet noted by the mixer to the footage number shown on the film at the beginning of the reel to determine the point of modification. After a rehearsal, the footage counter is usually returned to zero and this is accomplished by simply pressing a re-set switch. Other settings may also be made, as will be explained hereinafter.

Referring now to Fig. 2, the circuit for controlling the footage counter 20 is diagrammatically illustrated wherein the complete unit is shown as comprising a screen 40, a standard footage counter mechanism 41 having a plurality of discs bearing the numerals, a pair of lamps 42 for illuminating the counter 41 and a lens 43 for projecting the light to the screen 40. The lamps 42 are, of course, arranged to illuminate the counter in front of the lens 43. The counter 41 is driven in synchronism with the operation of the picture projector and sound reproducers by an impulse relay 45 which advances the first disc one-tenth of a revolution at each impulse, while a motor 46 is connected to the footage counter for re-setting purposes. The impulses for operating the counter 41 are supplied from the interrupter 30 driven through the gear reduction unit 29 from the motor 27 as shown in Fig. 1.

The footage counter unit is supplied from two sources of power—one, a 16-volt direct current supply from terminals 48; and, two, a 110-volt alternating current supply from terminals 49. The console switches 16 and 17 of Fig. 1 are shown in Fig. 2, switch 16 connecting the 16-volt supply through a relay winding 50 over conductors 51, 52, 53 and 54. The closing of switch 16, therefore, energizes and actuates relay 50 which causes it to close its two contacts 56 and 57. The closing of contact 56 energizes the lamps 42 over a circuit from the 110-volt source comprising conductor 59, contact 56, conductor 60, lamps 42 and conductor 61. Thus, closing of the switch 16 energizes the lamps 42 so that the numerals on the counter 41 may be viewed on the screen 40.

The actuation of relay 50 also closes contact 57, the closing of contact 57 closing the interrupter circuit for energizing the impulse relay 45. The impulse relay circuit is from the lower terminal of the 16-volt source over conductor 63, interrupter 30, conductor 64, contact 65, when closed, conductor 66, impulse relay 45, conductor 67 and conductor 54. The contact 65 is closed by the actuation of the light switch 16 when the contact 57 is made by relay 50. The circuit for the relay operating contact 65 is from the 110-volt supply over conductor 59, contact 57, conductor 69, contact 70, normally closed, conductor 71 and through a time delay switch 72 and relay 73, conductor 74 and conductor 61. The relay 73 and time delay switch 72 are provided to prevent interference between the operation of the interrupter circuit and the re-setting operation. In other words, the counter 41 may be re-set by a simple operation at any time regardless of whether or not the motor 27 is operating.

To explain the operation of the delay portion of the system, the contact 57 is first closed, which impresses energy from the 110-volt source across a heating element between terminals $a$ and $b$ over conductor 76, contact 77, normally closed, swinger element 78, conductor 79, winding of relay 73, conductor 74 and conductor 61. In view of the high resistance of the resistance element between terminals $a$ and $b$, insufficient energy passes through the winding 73 for operation of the delay relay. As the resistance element is heated by the current flowing therethrough, it eventually short-circuits terminals $a$ and $c$ after a predetermined time interval. At this instant, energy is supplied from conductor 71 across terminals $a$ and $c$ over conductor 81, conductor 79, winding of relay 73 and back to the 110-volt supply over conductors 74 and 61. The closing of this circuit operates the relay closing the contact 65 and thus connects the interrupter 30 to the impulse relay 45.

Simultaneously with the closing of contact 65, the contact 77 is broken and the swinger 78 makes contact at 82. The closing of contact 82 completes the relay holding circuit through the winding of relay 73 from conductor 71 over conductor 84, contact 82, swinger 78, conductor 79, winding of relay 73 and back to the 110-volt source over conductors 74 and 61. From the above description, it will be observed that the closing of contact 57 by relay 50 energizes relay 73 after a short time interval, which interval, of course, is the same regardless of at which point the circuit is made.

The above circuit is sufficient for placing the footage counter in operation in synchronism with the picture projection and sound reproducing apparatus. The re-setting portion of the system will now be described. The switch 17 (of the push-type) is the re-setting switch for the counter 41, and the closing thereof completes a circuit from the 16-volt source over conductor 54, switch 17, conductor 86, winding of relay 87, conductor 88 and conductor 53. Energization of the relay 87 breaks the contact 70 and makes contact 90. The breaking of contact 70 de-energizes the relay 73 and breaks the circuit from interrupter 30 to the impulse relay 45. The making of the contact 90 energizes the motor 46 from the 110-volt supply over a circuit including conductor 59, contact 57, conductor 69, contact 90, conductor 91, motor 46, conductor 92 and conductor 61. The motor 46 thus operates to return the footage counter 41 to zero or any other desired footage indication as long as the switch 17 is held closed. Upon the opening of switch 17, the relay 87 is of course de-energized, the motor-energizing contact 90 is broken, and the relay 73 energizing circuit is made at contact 70. However, since the motor 46 has a slight inertia and is not immediately stopped with the breaking of contact 90, a short time delay is provided by the relay 73 and delay switch 72 before the interrupter circuit is made at contact 65. This time delay thus permits the counter 41 and motor 46 to come to rest before the first impulse is impressed on the relay 45 from the interrupter 30, if in operation.

Thus, the above footage counter operating system permits complete control of the footage counter from a remote point such as the mixing console, as shown in Fig. 1, the operator being able to re-set the footage counter during a rehearsal as well as at the beginning or end thereof. Through the delay action, there is no interference between the two energizing circuits for the counter, thus avoiding damage to any apparatus caused by false or accidental operation of the control switches.

What I claim as my invention is:

1. A footage counter control system comprising a footage counter adapted to be operated in synchronism with the advancement of a motion picture film, an intermittent contact device rotatable at a rate determined by the advancement of said film, an impulse motor controlled by said contact device for advancing said counter, a time-delay relay connected intermediate said impulse motor and said contact device adapted to electrically interconnect said contact device and said impulse motor a predetermined time interval after said relay is energized, a power supply for said impulse motor connected to said contact device, a second power supply, a relay operable from said first power supply when connected thereto for connecting said second power supply to said delay relay, a second motor for said counter, said second power supply being connectable to said second motor, and means energized by said first power supply when connected thereto for connecting said second power supply to said second motor and for disconnecting said first power supply from said impulse motor, said time delay relay reconnecting said first power supply to said impulse motor a predetermined time interval after said second power supply has been disconnected from said second motor and said delay relay is simultaneously connected to said second power supply.

2. A footage counter control system for indicating the amount of film being projected comprising an impulse motor for said counter, a contactor for operating said impulse motor, a time-delay relay connected intermediate said motor and contactor for electrically connecting and disconnecting said motor and contactor, means for operating said contactor in synchronism with the projection of said film, a power supply for said impulse motor, a second motor for said counter, a second power supply for said second motor, and a relay system for controlling said impulse motor and said second motor, said relay system including a pair of switches, said first switch controlling the connecting and disconnecting of said second power supply to and from said time-delay relay, the energization and de-energization of said time-delay relay connecting and disconnecting said contactor to and from said impulse motor and said second switch connecting and disconnecting said time delay relay to and from said second power supply, and simultaneously connecting and disconnecting said second motor to and from said second power supply, whereby either said second motor or said time-delay relay is connected to said second power supply.

3. A footage counter control system comprising a counter having an impulse actuating means and a reversing actuating means, a source of power for said reversing means, a second source of power for said impulse actuating means, a relay energizable by said second source of power, a second relay energizable by said first mentioned source of power when said first mentioned relay is energized by said second source of power, the energization of said second relay connecting said second source of power to said impulse actuating means a predetermined time after said second relay is energized, and a third relay energizable by said second source of power, energization thereof de-energizing said second relay, thereby disconnecting said second source of power from said impulse actuating means and connecting said first mentioned source of power to said reversing actuating means.

4. A control system for a footage counter adapted to operate in synchronism with the advancement of a motion picture film comprising an impulse relay for advancing said counter, a power supply for said relay, means for interrupting the flow of power to said impulse relay at a rate determined by the speed of advancement of said film, a motor for reversing said counter, a power supply for said motor, a relay connected intermediate said impulse relay and said interrupting means, a second relay energizable by said impulse relay power supply for connecting said intermediate relay to said motor power supply for energizing said intermediate relay, and a third relay for de-energizing said intermediate relay and simultaneously connecting said reversing motor to said motor power supply, de-energization of said third relay simultaneously disconnecting said motor from its power supply and re-connecting said motor power supply to said intermediate relay for the energization thereof, said intermediate relay connecting said impulse relay to its power supply a predetermined time interval after energization of said intermediate relay.

5. A footage counter control system comprising an impulse motor for driving said counter in one direction, a second motor for driving said counter in the opposite direction, a first power supply for energizing said impulse motor, a second power supply for energizing said second motor, a first relay intermediate said first power supply and said impulse motor, the energization of said relay connecting said first power supply to said impulse motor, a second relay for controlling the energization of said first relay, a switch for connecting said second relay to said first power supply for the energization of said second relay, a third relay for controlling the energization of said first relay and the connection of said second motor to said second power supply, and a switch for connecting said third relay to said first power supply for the energization of said third relay, energization of said third relay causing the de-energization of said first relay and the connection of said second motor to said second power supply while de-energization of said third relay causes said second motor to be disconnected from said second power supply and said first relay to be re-energized.

THOMAS C. SHARP.